(No Model.)
W. A. SHAVER.
HOSE COUPLING.
No. 562,855. Patented June 30, 1896.
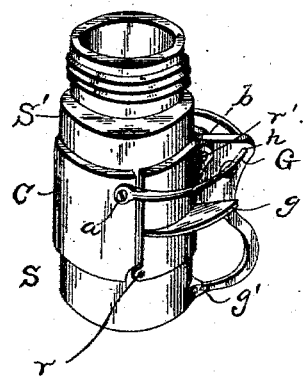
Fig. 1.
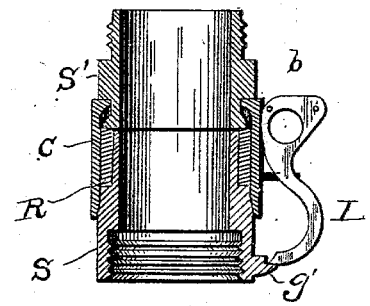
Fig. 2.
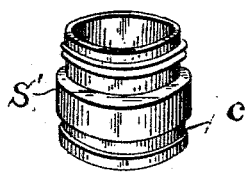
Fig. 3.
Fig. 4.
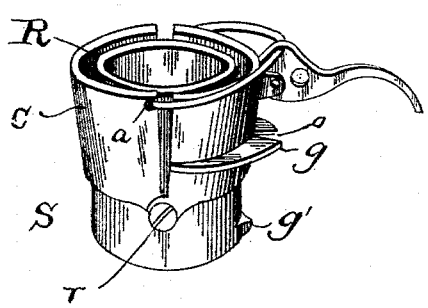
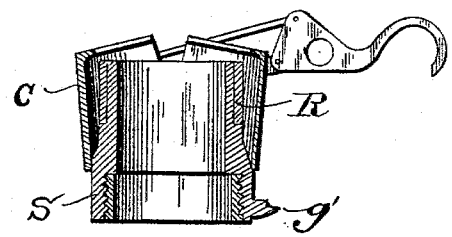
Witnesses:—
W. J. Koerth
Dorothy E. Aguirre
Inventor:—
Wm. A. Shaver
By Chas. E. Barber
Attorney.

UNITED STATES PATENT OFFICE.

WILLIAM A. SHAVER, OF CHEBOYGAN, MICHIGAN.

HOSE-COUPLING.

SPECIFICATION forming part of Letters Patent No. 562,855, dated June 30, 1896.

Application filed August 22, 1894. Serial No. 520,967. (No model.)

*To all whom it may concern:*

Be it known that I, WILLIAM A. SHAVER, a citizen of the United States, residing at Cheboygan, in the county of Cheboygan and State of Michigan, have invented new and useful Improvements in Hose-Couplings, of which the following is a specification.

My invention relates to new and useful improvements in hose-coupling in which the connection is made by means of a clutch device, and the object of my invention is to provide a coupling that can be quickly operated without the aid of any appliances other than those connected with the coupling and being a part of the device hereinafter described, and which shall be durable and reliable, and also by the use of which a connection can be made, either joining two sections of hose together or to a hydrant while water is flowing through the hose or from the hydrant.

With the above-recited and other minor objects in view my invention consists of the construction, arrangement, and combination of parts, as hereinafter fully described, illustrated in the accompanying drawings, and pointed out in the claims appended hereto.

Referring now to the drawings, Figure 1 is a perspective view of a coupling constructed in accordance with my invention. Fig. 2 is a vertical longitudinal sectional view. Fig. 3 is a view of the coupling with the clutch open and the male and female parts separated, and Fig. 4 is a vertical longitudinal section of the coupling as shown in Fig. 3.

Similar letters refer to similar parts in all the drawings.

The clutch C is constructed in two parts, and these parts are loosely hinged to the sleeve S by the rivets or screws $r$, that pass through the perforated terminals of the parts of the clutch and are fastened stationary in the sleeve S.

The clutch is operated by means of the eccentric lever L, attached to one part of the clutch by the rivet $r'$ in connection with the lugs $b$, through which the rivet passes.

The grip-spring G is a nearly semicircular metal spring with perforated terminals. This spring passes through the lever L at the point $h$ and is loosely hinged to the opposite part of the clutch by the rivets or screws $a$ passing through said perforated terminals and fastened stationary in the sleeve C. The connecting end of the clutch is constructed with a beveled flange, made to engage with the groove $c$ on the male part of the coupling S'. Said groove has its lower side beveled so that when the flange of the clutch engages therein and is closed the part S' is drawn against the end of the part S and the rubber jacket R, and thus a tight joint is formed.

The part of the clutch to which the lever L is attached is provided with a guard $g$, cast as a part of the clutch and extends from the body of the clutch slightly farther than the lever when closed and is to prevent the lever from becoming engaged with obstructions with which it might come in contact when the coupling was in use. This guard is provided with an opening $o$ in the center, into which opening the lever enters as it is shut.

The sleeve S is a cylinder-tube provided with a screw-thread or some other suitable arrangement for joining to a section of hose. The sleeve is somewhat reduced in thickness at the point where the clutch attaches to it, to form a shoulder or ledge to receive the bottom or hinged end of the clutch, and at a point a little nearer the clutch end of this sleeve it is again reduced in thickness and forms a shoulder against which one end of the rubber jacket rests. The guard $g'$ extends from the body of the sleeve at a point in a direct line from the lugs $b$ and the opening $o$, and forms a protection for the lower end of the lever when closed, and also forms a shoulder against which the end of the lever strikes.

S' is the male part of the coupling and is a cylinder-tube and has the groove $c$ at one end to receive the clutch and is to be attached by means of a screw-thread or any other suitable arrangement to the section of the hose or to a hydrant.

The rubber jacket R extends entirely around the part S, its lower end resting on the shoulder on the said part arranged for that purpose and the upper end extending flush with the upper end of the part S. When a connection is made, the inside of the clutch presses against this rubber jacket and the male part is drawn snugly against the upper end of the said rubber jacket, all being held firmly in place by the lever L and the grip-spring G and in connection with the other parts a perfectly tight and strong union is secured.

The lever L is made of steel or other suitable metal, and is of the shape shown in the drawings, but can be made in a variety of shapes, as may be found desirable. The lower end being of a semicircular form provides a suitable and convenient handle for working the same.

The spring-grip G is made of spring metal and is so adjusted to the clutch C and the lever L that when the lever is forced down against the guard $g'$ the point of maximum stress is slightly passed, so that the lever is held in its position.

The clutch and both the male and female parts of the coupling are made of brass, bronze, or other suitable metal and the cylinder-bore of the size of the section of the hose to be attached.

Having thus described my invention, what I claim, and desire to secure by Letters Patent, is—

1. The herein-described hose-coupling the same consisting of a clutch device hinged to a sleeve and having beveled flanges at the upper end, a lever attached to said clutch a spring-grip passing through the lever and attached to the opposite section of the clutch from the lever, a rubber jacket fitted around the sleeve of the female part of the coupling, a male part to the coupling having a groove with the connecting side or edge beveling, and the guards for the protection of the said lever, substantially as specified.

2. In a hose-coupling the combination of a female head consisting of a sleeve with a clutch loosely hinged thereto and having beveled flanges, an eccentric lever attached to the clutch, the spring-grip G, the guards $g$ and $g'$, the rubber jacket R, and the male part S' with its beveled groove $c$ substantially as set forth.

In testimony whereof I have hereunto affixed my signature in the presence of two witnesses.

WILLIAM A. SHAVER.

Witnesses:
EDITH S. TAYLOR,
SAML. H. TAYLOR.